(12) United States Patent
Fujimaki

(10) Patent No.: US 12,473,032 B2
(45) Date of Patent: Nov. 18, 2025

(54) VEHICLE SIDE PART STRUCTURE

(71) Applicant: TOYOTA JIDOSHA KABUSHIKI KAISHA, Aichi-ken (JP)

(72) Inventor: Hideyuki Fujimaki, Seto (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 430 days.

(21) Appl. No.: 18/321,002

(22) Filed: May 22, 2023

(65) Prior Publication Data

US 2024/0034410 A1  Feb. 1, 2024

(30) Foreign Application Priority Data

Jul. 26, 2022 (JP) .................................. 2022-118708

(51) Int. Cl.
B62D 21/15 (2006.01)

(52) U.S. Cl.
CPC .................................. B62D 21/152 (2013.01)

(58) Field of Classification Search
CPC . B60R 21/34; B60R 2021/343; B62D 21/152; B62D 25/02; B62D 25/08; B62D 25/16
See application file for complete search history.

(56) References Cited

FOREIGN PATENT DOCUMENTS

| CN | 104540724 A | * | 4/2015 |
|---|---|---|---|
| DE | 4104894 C2 | * | 10/2002 |
| JP | 2005153800 A | * | 6/2005 |
| JP | 2006-168677 A | | 6/2006 |
| JP | 2009-227188 A | | 10/2009 |
| JP | 5109350 B2 | * | 12/2012 |
| JP | 2013-502348 A | | 1/2013 |
| WO | 2011/022230 A2 | | 2/2011 |

* cited by examiner

*Primary Examiner* — Lori Lyjak
(74) *Attorney, Agent, or Firm* — HAUPTMAN HAM, LLP

(57) ABSTRACT

A vehicle side part structure includes a framework member of a vehicle, extending in a vehicle front and rear direction, and a fender panel provided at an outer side of the framework member in a vehicle width direction. The vehicle side part structure further includes a fender reinforcement provided between the framework member and an upper part of the fender panel, the fender reinforcement being made of a sheet material with a shape along a surface shape of the upper part of the fender panel, an opening provided in a region on an upper side of a middle part of the fender reinforcement, and a bead provided so as to extend in the vehicle front and rear direction in a region on a lower side of the opening.

2 Claims, 2 Drawing Sheets

VEHICLE SIDE PART STRUCTURE

CROSS-REFERENCE TO RELATED APPLICATION

This application claims priority to Japanese Patent Application No. 2022-118708 filed on Jul. 26, 2022 herein by reference in its entirety.

BACKGROUND

1. Technical Field

The disclosure relates to a vehicle side part structure.

2. Description of Related Art

For example, Japanese Patent No. 5146039 (JP 5146039 B) (Japanese Unexamined Patent Application Publication No. 2009-227188 (JP 2009-227188 A)) describes that the rigidity of a front fender is improved by providing a reinforcement member on an inner side of the front fender.

The reinforcement member is formed in a band shape. The reinforcement member is bonded with an adhesive to an upper and lower middle position of the front fender so as to be disposed in a vehicle front and rear direction.

A plurality of expanded parts of which the upper and lower width is slightly expanded is formed back and forth at intervals at each of an upper edge part and a lower edge part of the reinforcement member.

A lamp fitting part to which a head lamp unit is fitted is provided at the front edge of the front fender. The strength of an area around the lamp fitting part decreases due to the presence of the lamp fitting part, so the strength is reinforced by welding a reinforcement to the area around the lamp fitting part.

The front end part, the upper edge part, and the lower edge part of the reinforcement member are superposed on the reinforcement, and the superposed parts are spot-welded to the reinforcement.

SUMMARY

In JP 5146039 B (JP 2009-227188 A), the front fender is reinforced by the reinforcement and the reinforcement member, so the front fender presumably does not have such a structure that, when a pedestrian collides with the front fender, impact applied to the pedestrian is reduced.

In consideration of such a situation, the disclosure provides a vehicle side part structure capable of achieving both an ability to retain the shape of a front fender and a reduction of impact on a pedestrian in the event of a collision with the pedestrian.

An aspect of the disclosure relates to a vehicle side part structure that includes a framework member of a vehicle, extending in a vehicle front and rear direction, and a fender panel provided at an outer side of the framework member in a vehicle width direction. The vehicle side part structure further includes a fender reinforcement provided between the framework member and an upper part of the fender panel, the fender reinforcement being made of a sheet material with a shape along a surface shape of the upper part of the fender panel, an opening provided in a region on an upper side of a middle part of the fender reinforcement, and a bead provided so as to extend in the vehicle front and rear direction in a region on a lower side of the opening.

With this configuration, since the rigidity of the fender reinforcement improves because of the bead provided for the fender reinforcement, an ability to suppress a deformation of the shape of the upper part of the fender panel is improved by the fender reinforcement. In other words, an ability to retain the shape of the upper part of the fender panel improves.

If the head of a pedestrian collides with the upper part of the fender panel, a direct collision of the head of the pedestrian with the framework member is suppressed because of the presence of the fender reinforcement between the upper part of the fender panel and the framework member. In addition, since the fender reinforcement easily crushes due to the presence of the opening, impact energy to be input to the head of the pedestrian is absorbed and reduced.

For these reasons, it is possible to achieve both an ability to retain the shape of the fender panel and a reduction of impact on a pedestrian in the event of a collision with the pedestrian.

Incidentally, in the vehicle side part structure, the opening may have an isosceles triangle shape in which a vertex angle is disposed above and a base is disposed below when viewed laterally.

With this configuration, the bead is disposed on the lower side of the base of the opening in the fender reinforcement. Thus, when impact is applied to the opening of the fender reinforcement and an area around the opening, an area around the base of the opening in the fender reinforcement is hard to deform, and an area around the two equilaterals is easy to deform.

In other words, with the above configuration, since an area where the fender reinforcement is easy to deform is specified, it is advantageous in reducing impact on a pedestrian in the event of a collision with the pedestrian.

According to the aspect of the disclosure, it is possible to provide a vehicle side part structure capable of achieving both an ability to retain the shape of the front fender and a reduction of impact on a pedestrian in the event of a collision with the pedestrian.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the disclosure will be described in detail with reference to the accompanying drawings.

Figure 1:
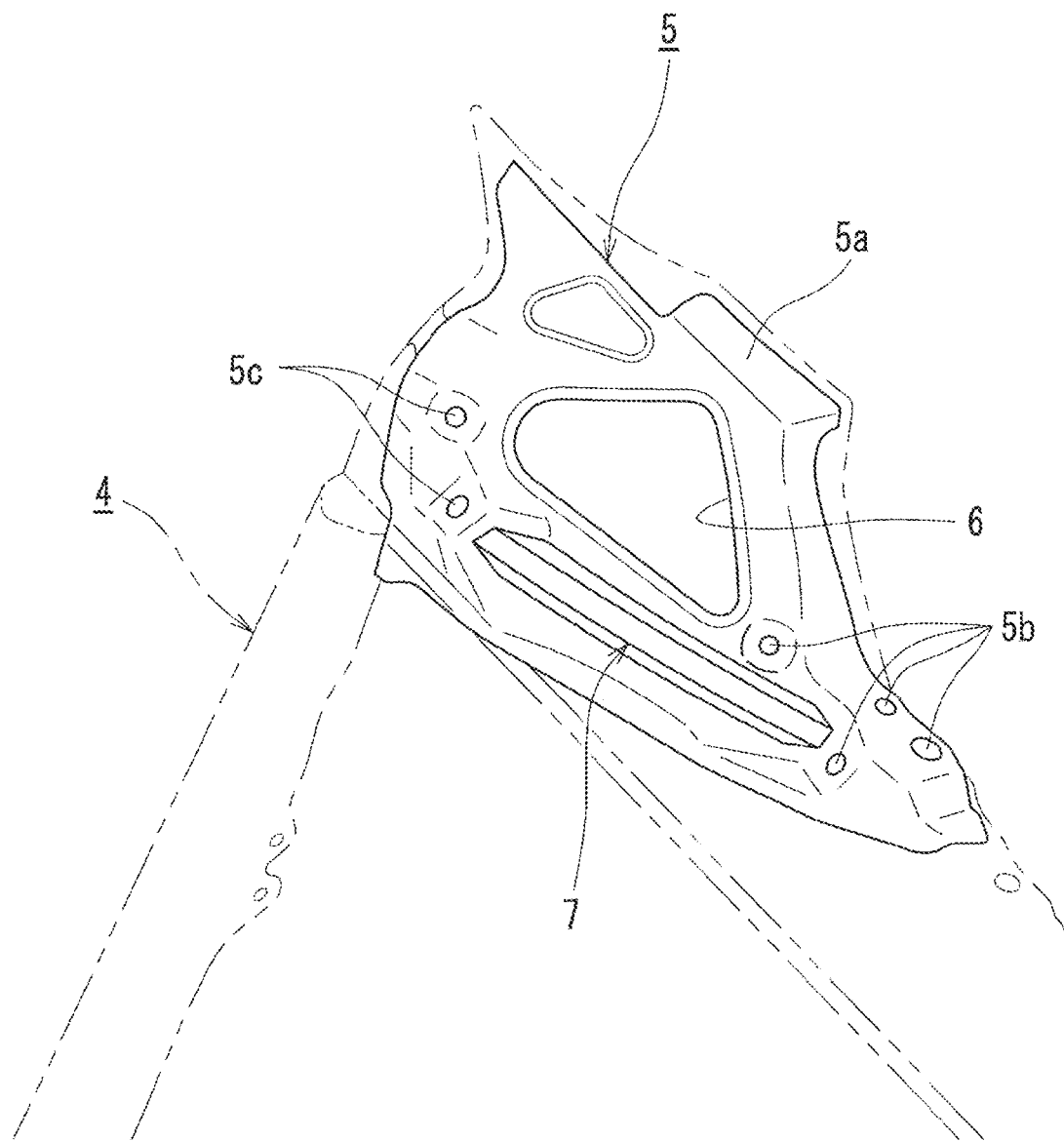
FIG. 1 is a perspective view that shows a vehicle side part structure according to an embodiment of the disclosure.
Figure 1:
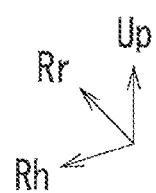
Figure 2:
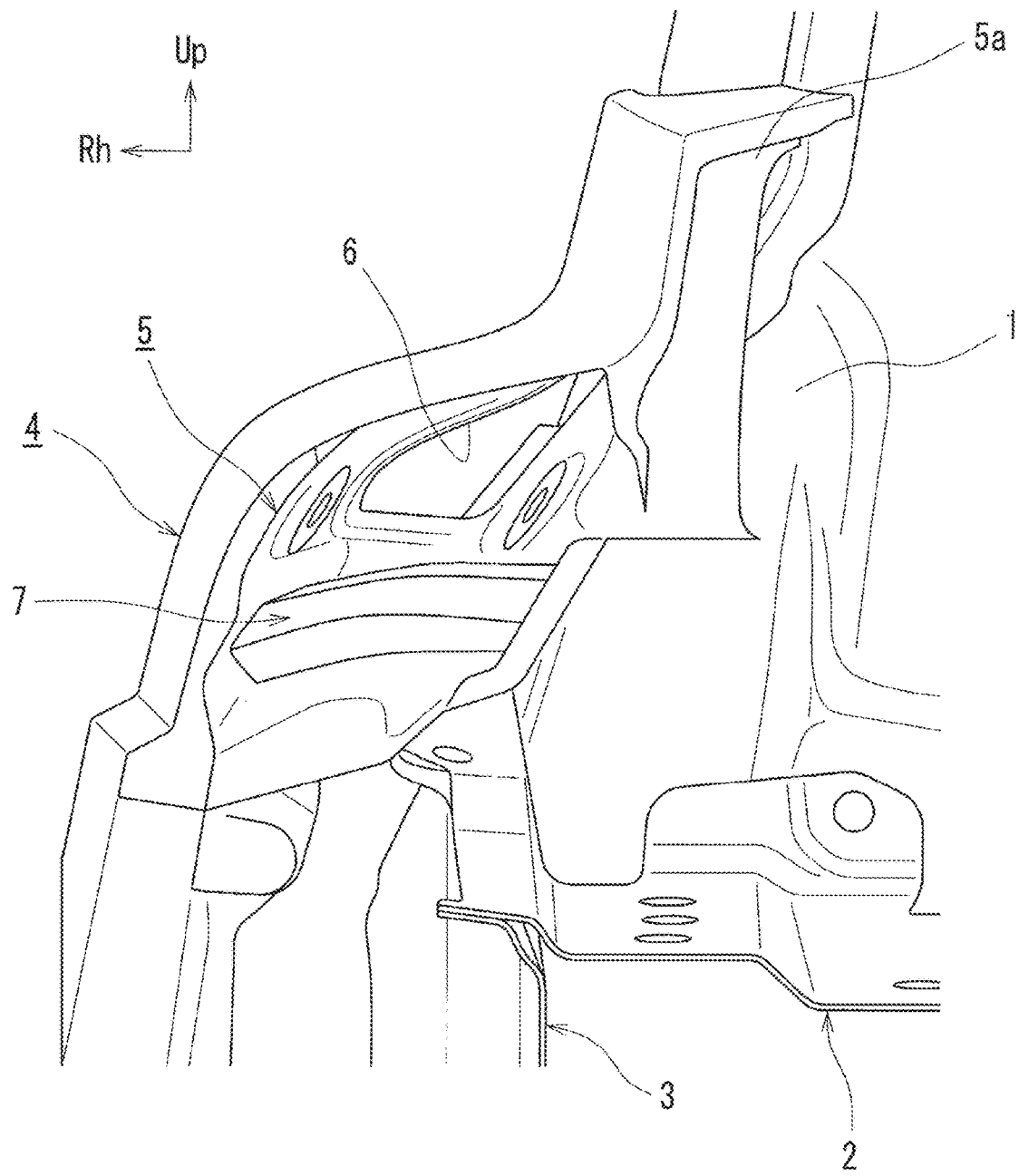
FIG. 2 is a cross-sectional view of the vehicle side part structure at a predetermined position when a vehicle is viewed from a front side toward a rear side.

FIG. 1 and FIG. 2 show one embodiment of the disclosure. In the drawings, Up indicates the upper side of a vehicle, Rr indicates the rear side of the vehicle, and Rh indicates the right-hand side of the vehicle.

In the drawings, the reference numeral 1 indicates a vehicle body, the reference numeral 2 indicates an apron upper member inner, the reference numeral 3 indicates an apron upper member outer, and the reference numeral 4 indicates a front fender panel. The apron upper member inner 2 and the apron upper member outer 3 may be regarded as a framework member recited in the appended claims.

A fender reinforcement 5 is provided between the apron upper member inner 2 and an upper part of the fender panel 4.

A surface shape of a region connected to an A-pillar (not shown) of the vehicle body 1 at the upper part of the fender panel 4 is a convex curved surface bowed outward as shown in FIG. 2.

As shown in FIG. 2, the fender reinforcement 5 is made of a sheet material (for example, a metal sheet or the like) with a shape along the convex curved surface at the upper part of the fender panel 4.

A flat part 5a is provided at the upper part of the fender reinforcement 5. The flat part 5a is provided so as to align the fender reinforcement 5 with respect to the fender panel 4.

Specifically, although not shown in detail in the drawing, the flat part 5a of the fender reinforcement 5 is attached to the fender panel 4 via an adhesive (not shown, for example, a mastic or the like) and then fixed by using, for example, spot welding or a fastening member (a bolt and a nut or the like).

Although not shown in detail in the drawing, other several portions 5b, 5c other than the flat part 5a in the fender reinforcement 5 are also fixed to the fender panel 4 by using, for example, spot welding or a fastening member (a bolt and a nut or the like).

An opening 6 is provided in a middle region of the fender reinforcement 5. The opening 6 has a shape like an isosceles triangle in which a vertex angle is disposed above and a base is disposed below when viewed laterally.

A bead 7 is provided in a region below the base of the opening 6 in the fender reinforcement 5.

The bead 7 is bowed outward of the vehicle body 1 and is formed in a shape that extends in a band-like shape in the vehicle front and rear direction.

With the embodiment to which the disclosure is applied as described above, since the rigidity of the fender reinforcement 5 improves because the bead 7 is provided for the fender reinforcement 5, an ability to suppress a deformation of the shape of the upper part of the fender panel 4 is improved by the fender reinforcement 5. In other words, an ability to retain the shape of the upper part of the fender panel 4 improves.

If the head of a pedestrian collides with the upper part of the fender panel 4, a direct collision of the head of the pedestrian with the apron upper member inner 2 (framework member) is prevented because of the presence of the fender reinforcement 5 between the upper part of the fender panel 4 and the apron upper member inner 2. In addition, since the fender reinforcement 5 easily crushes due to the presence of the opening 6, impact energy to be input to the head of the pedestrian is absorbed and reduced.

For these reasons, it is possible to achieve both an ability to retain the shape of the fender panel 4 and a reduction of impact on a pedestrian in the event of a collision with the pedestrian.

Here, if the head of a pedestrian collides with the upper part of the fender panel 4 in the configuration in which no fender reinforcement 5 is provided, the upper part of the fender panel 4 easily crushes as compared to the configuration in which the fender reinforcement 5 is provided as in the case of the present embodiment. Therefore, there are concerns that damage is applied to the head of the pedestrian, for example, the head of the pedestrian presumably directly collides with the apron upper member inner 2.

The disclosure is not limited to the embodiment only and may be modified as needed within the scope of the appended claims and equivalents thereof.

In the embodiment, the shape of the opening 6 and the shape of the bead 7 are not limited and may be, for example, modified as needed although not shown in the drawings.

The disclosure is usable suitably in a vehicle side part structure.

What is claimed is:

1. A vehicle side part structure that includes a framework member of a vehicle, extending in a vehicle front and rear direction, and a fender panel provided at an outer side of the framework member in a vehicle width direction, the vehicle side part structure comprising:
   a fender reinforcement provided between the framework member and an upper part of the fender panel, the fender reinforcement being made of a sheet material with a shape along a surface shape of the upper part of the fender panel;
   an opening provided in a region on an upper side of a middle part of the fender reinforcement; and
   a bead provided in a region on a lower side of the opening so as to extend in the vehicle front and rear direction.

2. The vehicle side part structure according to claim 1, wherein the opening has an isosceles triangle shape in which a vertex angle is disposed above and a base is disposed below when viewed laterally.

* * * * *